(12) United States Patent
Van de Roer et al.

(10) Patent No.: US 11,283,980 B2
(45) Date of Patent: Mar. 22, 2022

(54) SYSTEM AND METHOD FOR RECORDING, AS A SINGLE CINEMATIC SEQUENCE OF FRAMES, IMAGES OF A SCENE ILLUMINATED WITH TWO DIFFERENT LIGHTING SCHEMES BY TIMING ALTERNATE ACTUATION OF THE LIGHTING SCHEMES WITHIN PAIRS OF ADJACENT FRAMES TO MINIMIZE VISUAL MOTION ARTIFACTS BETWEEN IMAGES CAPTURED THEREIN

(71) Applicant: Satellite Lab, LLC, Brooklyn, NY (US)

(72) Inventors: Carlo Van de Roer, Brooklyn, NY (US); Stuart Rutherford, Brooklyn, NY (US)

(73) Assignee: Satellite Lab, LLC, Lewes, DE (US)

( * ) Notice: Subject to any disclaimer, the term of this patent is extended or adjusted under 35 U.S.C. 154(b) by 0 days.

(21) Appl. No.: 16/186,479

(22) Filed: Nov. 9, 2018

(65) Prior Publication Data
US 2019/0141223 A1  May 9, 2019

Related U.S. Application Data

(60) Provisional application No. 62/584,020, filed on Nov. 9, 2017.

(51) Int. Cl.
*H04N 5/225* (2006.01)
*H04N 5/235* (2006.01)
*G03B 15/05* (2021.01)

(52) U.S. Cl.
CPC .......... *H04N 5/2256* (2013.01); *G03B 15/05* (2013.01); *H04N 5/2257* (2013.01); *H04N 5/2352* (2013.01)

(58) Field of Classification Search
CPC .. H04N 5/2256; H04N 5/2352; H04N 5/2257; G03B 15/05
See application file for complete search history.

(56) References Cited

U.S. PATENT DOCUMENTS

| 7,436,403 | B2 | 10/2008 | Debevec | |
|---|---|---|---|---|
| 9,743,010 | B1* | 8/2017 | Edwards | H04N 5/2357 |
| 2005/0199783 | A1* | 9/2005 | Wenstrand | G06F 3/013 |
| | | | | 250/214.1 |

(Continued)

*Primary Examiner* — Gevell V Selby
(74) *Attorney, Agent, or Firm* — Russ Weinzimmer & Associates, P.C.

(57) ABSTRACT

An apparatus and method for recording a scene using two lighting setups in alternation so as to concurrently record motion picture footage of the scene for each lighting setup, the footage for the two lighting setups having minimized motion offset. The apparatus includes: a plurality of light sources, a controller to define two lighting setups using the plurality of light sources, and to actuate the lighting setups in alternation, a camera to capture a sequence of frames showing the scene illuminated by one of the two lighting setups in alternation, and optionally a processing module to process the sequence of frames to generate two clips of footage of the scene, each corresponding to a lighting setup. The timing of actuation of the lighting setups relative to the frame boundaries avoids the need to use optical flow algorithms to remove motion artifacts, and the need for a specialized high speed camera.

16 Claims, 8 Drawing Sheets

(56) References Cited

U.S. PATENT DOCUMENTS

2010/0049488 A1* 2/2010 Benitez ................ G06T 15/506
                                                         703/6
2011/0242334 A1* 10/2011 Wilburn ............... H04N 5/2354
                                                       348/207.1
2015/0062863 A1* 3/2015 Libreri .................. G03B 15/02
                                                         362/11

* cited by examiner

SYSTEM AND METHOD FOR RECORDING, AS A SINGLE CINEMATIC SEQUENCE OF FRAMES, IMAGES OF A SCENE ILLUMINATED WITH TWO DIFFERENT LIGHTING SCHEMES BY TIMING ALTERNATE ACTUATION OF THE LIGHTING SCHEMES WITHIN PAIRS OF ADJACENT FRAMES TO MINIMIZE VISUAL MOTION ARTIFACTS BETWEEN IMAGES CAPTURED THEREIN

CROSS-REFERENCE TO RELATED APPLICATIONS

This application claims priority from Provisional Patent Application Ser. No. 62/584,020, filed Nov. 9, 2017, the entire contents of which is incorporated herein by reference.

FIELD OF THE INVENTION

This invention relates generally to illumination and recording of scenes using multiple lighting sources, and particularly to producing motion picture footage for each of a plurality of lighting setups.

BACKGROUND OF THE INVENTION

In the film industry, it is common to use different lighting setups to add creative and/or technical value to a motion picture. It can be advantageous to film the same scene under different lighting conditions, and later choose the most desirable lighting effect.

Furthermore, it can be desirable to have the option of combining different lighting setups in post-production. Traditionally, multiple "takes" are filmed under different lighting setups, and are then edited to restore the continuity of a motion picture scene. This is because, with traditional motion picture film technology, it is not possible to film a motion picture scene with more than one lighting setup in only one "take".

In an attempt to address this issue, Debevec, U.S. Pat. No. 7,436,403 B2 teaches a lighting apparatus that can be configured to illuminate a subject while the subject is undergoing a motion. The lighting apparatus uses a controller configured to control a plurality of lights at different locations to illuminate the subject from different directions and with different light intensities. The timings of the different light illuminations are determined by the controller so as to sequentially and rapidly illuminate the subject. A high-speed camera records the rapid and sequential illuminations and records these as a time-multiplexed series of lighting conditions. The time-multiplexed series of lighting conditions may then be de-multiplexed and used to reconstruct and synthesize an image that is played back at standard cinematographic film speed.

However, the apparatus of U.S. Pat. No. 7,436,403 B2 has disadvantages. After the recorded data is de-multiplexed, complex optical flow algorithms may be required to remove motion artifacts. Also, the apparatus must record the moving subject using a high-speed camera and high speed data storage equipment. Such expensive equipment increases the cost of filming. Also, the resulting overabundance of data is difficult to store. As a result, the maximum length of time of the recording may be limited to only a few seconds. Further, use of a high speed camera also tends to provide lower than ideal image quality and resolution.

In addition, the positions of the light source may be constrained to a specific shape, such as a dome shape. In the apparatus of U.S. Pat. No. 7,436,403 B2, the complexity of the lighting setup increases both the time and the expense of filming.

SUMMARY OF THE INVENTION

The apparatus and method of the invention provide a way to illuminate and record a scene such that multiple lighting setups can be captured concurrently using a cinema or still camera (digital or film), which may also be a high speed digital cinema camera. Also two or more cameras can be used to record the same scene from the same point of view. Each or any camera may have the capability to have its settings changed on a frame by frame basis.

The invention provides the ability to capture motion picture footage illuminated by two lighting setups concurrently. Each of the two lighting setups is recorded as interleaved footage of the same scene, with minimized motion offset. "Motion offset" refers to apparent motion of an object in the scene upon transition from frame illuminated by a first lighting setup to a frame illuminated by a second lighting setup. Motion offset can also refer to the separation distance between a first image of the object due to the first lighting setup and a second image of the object due to the second lighting setup, when the first and second images are superimposed in the same frame.

The benefits of the invention include minimized motion offset, and avoiding the need to employ complex optical flow algorithms to remove motion artifacts. Consequently, the invention enables the use of relatively inexpensive standard speed cameras. Thus, the cost of using the apparatus and method can be kept to a minimum by avoiding the need to use expensive high speed cameras, thereby reducing the cost of filming. Further, the resulting image data produced is just double of what is typically captured, and so it is relatively easy to store and manipulate. As a result, the length of time of the recording can be extended to typical clip durations. In addition, the positions of the light sources are not constrained, permitting more creative expression via freedom to place each light source where desired, thereby facilitating rapid setup and consequent reduced expense of filming. Further, the apparatus and method of the invention enable use of industry standard lighting equipment, as well as non-standard lighting equipment.

The two lighting setups are alternately captured using at least one different light source and also possibly different camera settings for different frames being recorded by the camera. A hardware device (that is configurable via software) detects the frames being recorded by the camera and triggers the corresponding lights of respective lighting setups on specific frames to record the two different lighting setups. The camera can also be setup (either in the control menu through the camera, or via an API) to have different settings per frame. Once the footage has been recorded, the differing frames can be separated into two respective sets of frames corresponding to one of the two lighting setup to which they correspond. Each set of frames can then be processed as an individual clip, thereby providing one complete clip of the same scene for each of the two lighting setups.

There will be at least one synced light source in one lighting setup, but there can be more than one synced light source, and there can be synced light sources in more than one lighting setup, or even in all lighting setups. Additionally, the lighting setups can change during capture of the footage. For example, one or more light sources can be dimmed, and/or the lighting level can be brought up during the capture of the footage. The same light source can be used for more than one setup, but the level of light output can be changed per frame, so that it is different depending on which lighting setup the light source is participating in.

Two groups/sets of light sources are positioned in the desired location and configurable software controls which light sources are fired for each frame that is recorded by the camera. Each of the two lighting setups is fired for one frame before moving onto the next. The frames for each of the two lighting setups can then be extracted from the footage, and played back separately to show only one lighting setup per clip. These clips of footage representing different lighting setups can be combined in post for creative or technical flexibility and efficiency.

The invention can be used to concurrently record two lighting setups of live action which can be used as separate clips of footage:

Blue-screen lighting and main scene lighting.
Different creative lighting set-ups, such as day/night, sun/rain, key light/edge light.
Key lighting and VFX lighting for tracking or effect.

A general aspect of the invention is an apparatus for recording a scene using two alternating lighting setups so as to concurrently record a motion picture clip of the same scene for each lighting setup of the scene. The apparatus includes: a plurality of light sources, each light source configured to illuminate the scene; a controller configured to: enable a user to define two lighting setups using at least two of the plurality of light sources, and actuate the two lighting setups in alternation in accordance with a timing signal; and a camera configured to capture a sequence of frames, each one of the frames showing the scene illuminated by one of the two lighting setups in alternation.

In some embodiments, the apparatus further includes: a processing module configured to process the sequence of frames so as to generate two separate clips of footage of the scene, each clip corresponding to one of the lighting setups.

In some embodiments, the controller is configured to: actuate the two lighting setups in alternation in accordance with a timing signal such that a first lighting setup is actuated just prior to an end of a frame, and a second lighting setup is actuated just after a beginning of an immediately subsequent frame.

In some embodiments, a time interval starting upon actuation of the first lighting setup and ending upon the second lighting setup going dark after actuation does not exceed 17 milliseconds.

In some embodiments, the timing signal is derived from the camera in accordance with a frame rate of the camera.

In some embodiments, the timing signal is derived from a time clock configured to provide a clock signal.

In some embodiments, the controller is also configured to: enable a user to define the two lighting setups so as to include at least one camera parameter that can change from frame to frame, and alternatingly actuate the at least one camera parameter for each of the two lighting setups in accordance with the timing signal.

In some embodiments, the at least one camera parameter can include at least one of: sensitivity (ISO); aperture; ND (neutral density filter); and shutter angle.

Another general aspect of the invention is an apparatus for recording a scene using two alternating lighting setups so as to concurrently produce a motion picture clip of the same scene for each lighting setup of the scene, the motion picture clips having minimized motion offset with respect to each other. This apparatus includes: a plurality of light sources, each light source configured to illuminate the scene; a first lighting setup selected from the plurality of light sources; a second lighting setup selected from the plurality of light sources, the second lighting setup being different from the first lighting setup; a camera configured to capture a sequence of frames, each one of the frames showing the scene illuminated by first lighting setup or by the second lighting setup, in alternating relationship, the camera also configured to provide a frame boundary signal at a beginning and at an end of each frame; and a controller configured to actuate the two lighting setups in alternation in accordance with the frame boundary signal such that a first lighting setup is actuated just prior to an end of a frame, and a second lighting setup is actuated just after a beginning of an immediately following frame.

In some embodiments, the apparatus further includes: a processing module configured to process the sequence of frames so as to generate two separate clips of footage of the scene, each clip corresponding to one of the lighting setups.

In some embodiments, a time interval starting upon actuation of the first lighting setup and ending upon the second lighting setup going dark after actuation does not exceed 17 milliseconds.

In some embodiments, the controller is also configured to: enable a user to define the two lighting setups so as to include at least one camera parameter that can change from frame to frame, and alternatingly actuate the at least one camera parameter for each of the two lighting setups in accordance with a timing signal.

In some embodiments, the at least one camera parameter can include at least one of: sensitivity (ISO); aperture; ND (neutral density filter); and shutter angle.

Another general aspect of the invention is a method for recording a scene using two alternating lighting setups so as to concurrently produce a motion picture clip of the scene for each lighting setup of the scene, the motion picture clips having minimized motion offset with respect to each other. The method includes: selecting a plurality of light sources, each light source configured to illuminate the scene; selecting a first lighting setup from the plurality of light sources; selecting a second lighting setup from the plurality of light sources, the second lighting setup selected being different from the first lighting setup; actuating the first lighting setup and the second lighting setup in alternation in accordance with a timing signal, including actuating the first lighting setup just prior to an end of a frame, and actuating the second lighting setup just after a beginning of an immediately subsequent frame; and capturing a sequence of frames using a camera, each one of the frames showing the scene illuminated by one of the two lighting setups in alternation.

In some embodiments, the method further includes: processing the sequence of frames so as to generate two separate clips of footage of the scene, each clip corresponding to one of the lighting setups.

In some embodiments, a time interval starting upon actuation of the first lighting setup and ending upon the second lighting setup going dark after actuation does not exceed 17 milliseconds.

In some embodiments, the timing signal is derived from the camera in accordance with a frame rate of the camera.

In some embodiments, the timing signal is derived from a time clock configured to provide a clock signal.

In some embodiments, selecting a first lighting setup from the plurality of light sources includes selecting at least one camera parameter that can change from frame to frame; and selecting a second lighting setup from the plurality of light sources, the second lighting setup selected being different from the first lighting setup, includes selecting at least one camera parameter that changes from frame to frame in alternating relationship in accordance with the timing signal.

In some embodiments, the at least one camera parameter can include at least one of: sensitivity (ISO); aperture; ND (neutral density filter); and shutter angle.

BRIEF DESCRIPTION OF THE DRAWINGS

Many additional features and advantages will become apparent to those skilled in the art upon reading the following description, when considered in conjunction with the accompanying drawings, wherein.

DETAILED DESCRIPTION

Figure 1A:
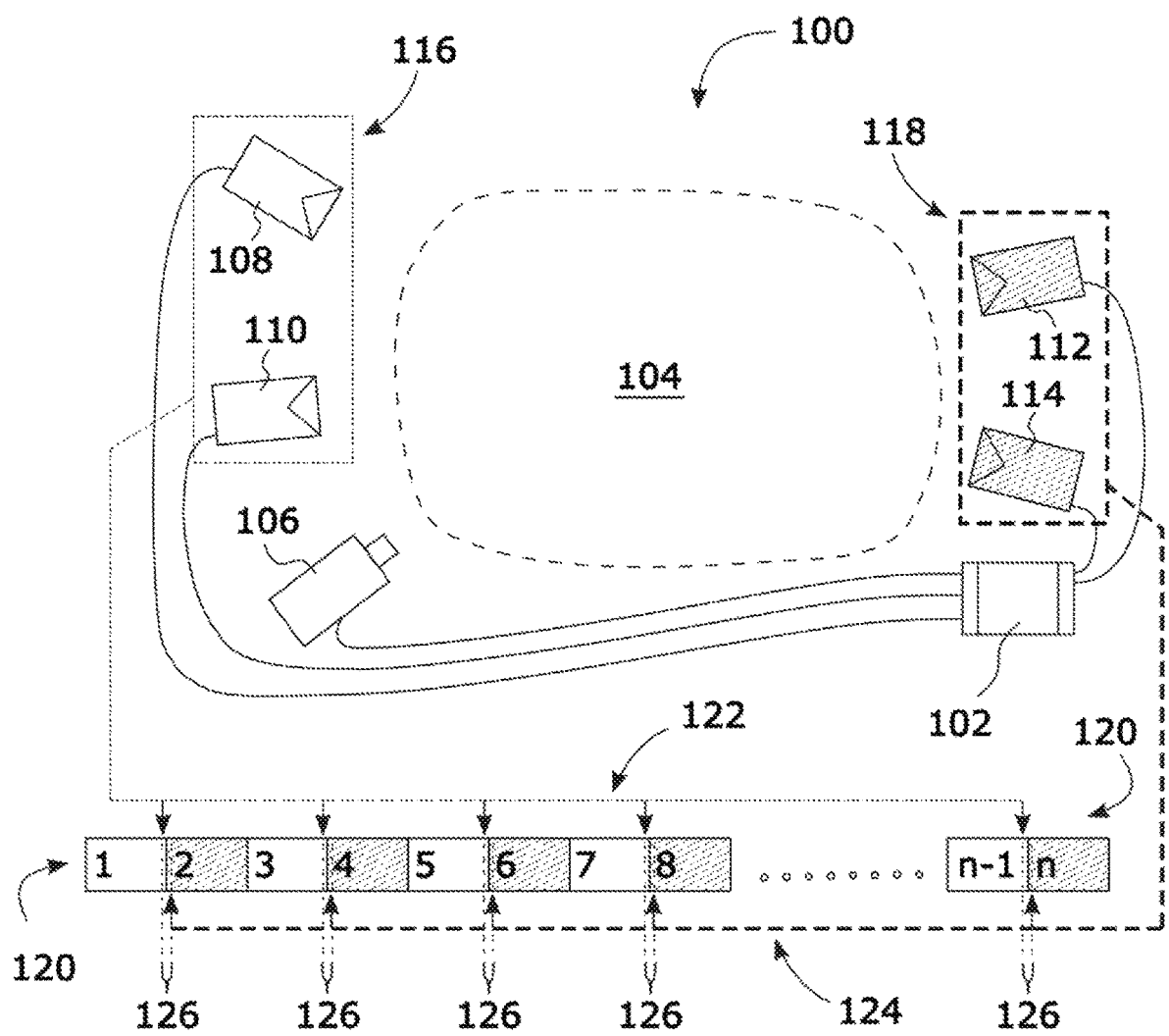
FIG. 1A is a schematic diagram of a scene illuminated alternately by one of two lighting setups, with minimal motion offset between frames corresponding to the two lighting setups.

With reference to FIG. 1A, a schematic diagram of a top view of a scene lit with four light sources is shown of an apparatus for recording a scene using multiple lighting setups 100. The apparatus for recording a scene using multiple lighting setups 100 includes a controller 102 in communication with a camera 106 configured to record a scene 104. The controller 102 is also in communication with lighting equipment consisting of: a light source 108, a light source 110, a light source 112, and a light source 114. The lighting is divided into two lighting setups: a first lighting setup 116, and a second lighting setup 118. A light source can be a strobe light, one or more LEDs, or other light source that can be switched on and off relatively rapidly.

Flash duration of a light source is commonly described by two numbers that are expressed in fractions of a second:
t.1 is the length of time the light intensity is above 0.1 (10%) of the peak intensity
t.5 is the length of time the light intensity is above 0.5 (50%) of the peak intensity For example, a single flash event might have a t.5 value of $\frac{1}{1200}$ and t.1 of $\frac{1}{450}$. These values determine the ability of a flash to "freeze" moving subjects in applications such as sports photography.

Individual strobe flashes typically last approximately 200 microseconds, i.e., 0.2 milliseconds, i.e., ⅕ of a millisecond, but can be sustained for greater or lesser periods of time depending on the strobe's intended use.

Here are some time durations for comparison:
0.2 milliseconds—duration of a typical strobe flash
1 millisecond (1 ms)—duration of light for typical photo flash strobe.
2 milliseconds to 5 milliseconds—typical response time in LCD computer monitors, especially high-end displays
8 milliseconds—$\frac{1}{125}$ of a second, a standard camera shutter speed (125)
16.68 milliseconds (1/59.94 second)—the amount of time one field lasts in 29.97 fps interlaced video (commonly but erroneously referred to as 30 fps)
33.367 milliseconds—the amount of time one frame lasts in 29.97 fps video (most common for NTSC-legacy formats)
41.667 milliseconds—the amount of time one frame lasts in 24 fps video (most common cinematic frame rate)
41.708 milliseconds—the amount of time one frame lasts in 23.976 fps video (cinematic frame rate for NTSC-legacy formats)
134 milliseconds—time taken by light to travel around the Earth's equator
200 milliseconds—the time it takes the human brain to recognize emotion in facial expressions
300 to 400 milliseconds—the time for the human eye to blink
1000 milliseconds—one second The camera 106 records the action in scene 104 as a sequence frames 120. The camera can be a camera with a standard frame rate, or a relatively high speed camera. The sequence of frames 120 includes odd frames 122 and even frames 124. The scene 104 is alternately illuminated by the first lighting setup 116, and then the second lighting setup 118. The even frames 122 record the scene 104 illuminated by the first lighting setup 116, and the odd frames record the scene 104 illuminated by the second lighting setup 118. Lighting intervals 126 are shown to indicate the duration of the time interval between the illumination of the first lighting setup 116, and the illumination of the second lighting setup 118. The controller 102 controls the timing of the lighting intervals 126. The lighting intervals 126 are chosen such that the illumination from the first lighting setup 116 and the illumination from the second lighting setup 118 provide minimal motion offset between frames corresponding to the two lighting setups.

Figure 1B:
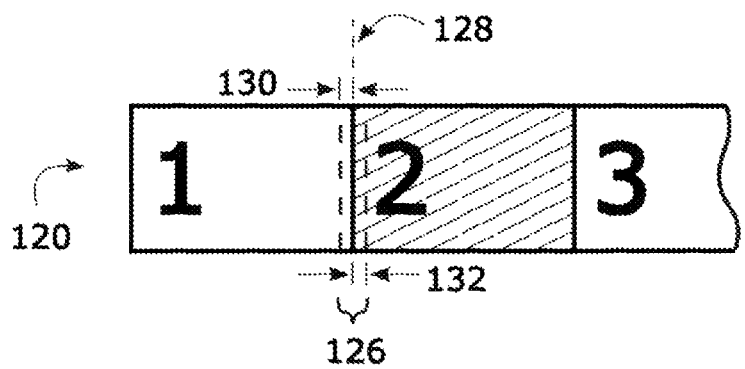
FIG. 1B is a schematic diagram of a sequence of frames recorded at a standard cinematic frame rate, showing the odd frames, the even frames, and a short-duration lighting interval that is suitable for a standard-speed motion of the filmed scene.

With reference to FIG. 1B, a schematic diagram is shown of the sequence of frames 120, recorded at a standard cinematic frame rate, and with a short-duration lighting interval 126 that is suitable for a standard-speed motion of the filmed scene 104. In some embodiments, a standard cinematic frame rate can be 30 Hz. As shown in FIG. 1A, the odd frames 122 correspond to illumination from the first lighting setup 116, and the even frames 124 correspond to illumination from the second lighting setup 118. An even-odd frame boundary 128 indicates the time when the end of an odd frame coincides with beginning of the adjacent even frame. The lighting interval 126 includes a leading interval 130 and a trailing interval 132, both of which combine to form the lighting interval 126. In preferred embodiments, the leading interval 130 and the trailing interval 132 are substantially equal in time duration. In this embodiment, the lighting interval 126 is short in duration, to substantially minimize visual artifacts (such as motion offset between frames corresponding to the two lighting setups) when post processing the sequence of frames 120, if standard-speed motion is present in the scene 104 (shown in FIG. 1A).

Figure 1C:
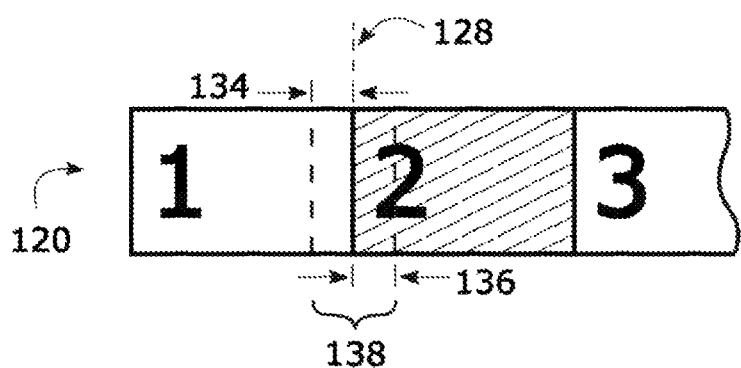
FIG. 1C is a schematic diagram of a sequence of frames recorded at a standard cinematic frame rate, showing the odd frames, the even frames, and an long-duration lighting interval that is that is suitable for a slow-speed motion of the filmed scene.

With reference to FIG. 1C, a schematic diagram is shown of the sequence of frames 120, recorded at a standard cinematic frame rate, and with a long-duration lighting interval 126 that is suitable for a slow-speed motion of the filmed scene 104. In some embodiments, a standard cinematic frame rate can be 30 Hz. The even-odd frame boundary 128 indicates the time when the end of an odd frame coincides with beginning of the adjacent even frame. The lighting interval 138 includes a leading interval 134 and a trailing interval 136, both of which sum to form the lighting interval 138. In preferred embodiments, the leading interval 134 and the trailing interval 136 are substantially equal in time duration. In this embodiment, the lighting interval 138 is long in duration, however, if only slow-speed motion is present in the scene 104 (shown in FIG. 1A), there will be no visual artifacts (such as motion offset between frames corresponding to the two lighting setups) when post processing the sequence of frames 120.

Figure 1D:
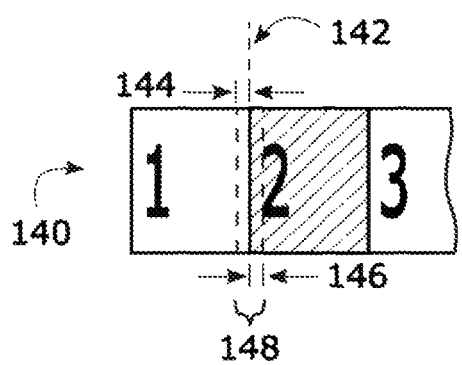
FIG. 1D is a schematic diagram of a sequence of frames recorded at a rapid cinematic frame rate, showing the odd frames, the even frames, and a short-duration lighting interval that is suitable for a standard-speed motion of the filmed scene.

With reference to FIG. 1D, a schematic diagram is shown a sequence of frames 140, recorded at a fast cinematic frame rate, and with a short-duration lighting interval 148 that is suitable for a standard-speed motion of the filmed scene 104. In some embodiments, a fast cinematic frame rate can be 60 Hz. An even-odd frame boundary 142 indicates the time when the end of an odd frame coincides with beginning of the adjacent even frame. The lighting interval 148 includes a leading interval 144 and a trailing interval 146, both of which sum to form the lighting interval 148. In preferred embodiments, the leading interval 144 and the trailing interval 146 are substantially equal in time duration. In this embodiment, the lighting interval 148 is short in duration, to substantially minimize visual artifacts (such as motion offset between frames corresponding to the two lighting setups) when post processing the sequence of frames 140, if standard-speed motion is present in the scene 104 (shown in FIG. 1A).

Figure 1E:
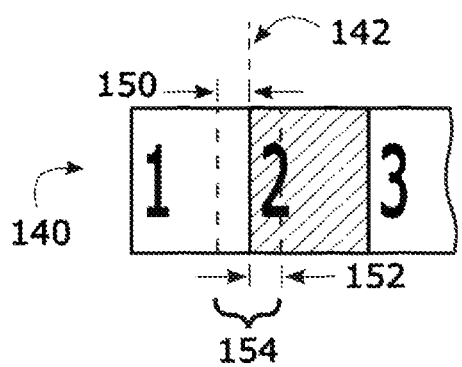
FIG. 1E is a schematic diagram of a sequence of frames recorded at a rapid cinematic frame rate, showing the odd frames, the even frames, and an long-duration lighting interval that is suitable for a slow-speed motion of the filmed scene.

With reference to FIG. 1E, a schematic diagram is shown of the sequence of frames 140, recorded at a fast cinematic frame rate, and with a long-duration lighting interval 154 that is suitable for a slow-speed motion of the filmed scene 104. In some embodiments, a fast cinematic frame rate can be 60 Hz. The even-odd frame boundary 142 indicates the time when the end of an odd frame coincides with beginning of the adjacent even frame. The lighting interval 154 includes a leading interval 150 and a trailing interval 152, both of which sum to form the lighting interval 154. In preferred embodiments, the leading interval 150 and the trailing interval 152 are substantially equal in time duration. In this embodiment, the lighting interval 154 is long in duration, however, if only slow-speed motion is present in the scene 104 (shown in FIG. 1A), there will be substantially no visual artifacts (such as motion offset between frames corresponding to the two lighting setups) when post processing the sequence of frames 140.

Figure 2:
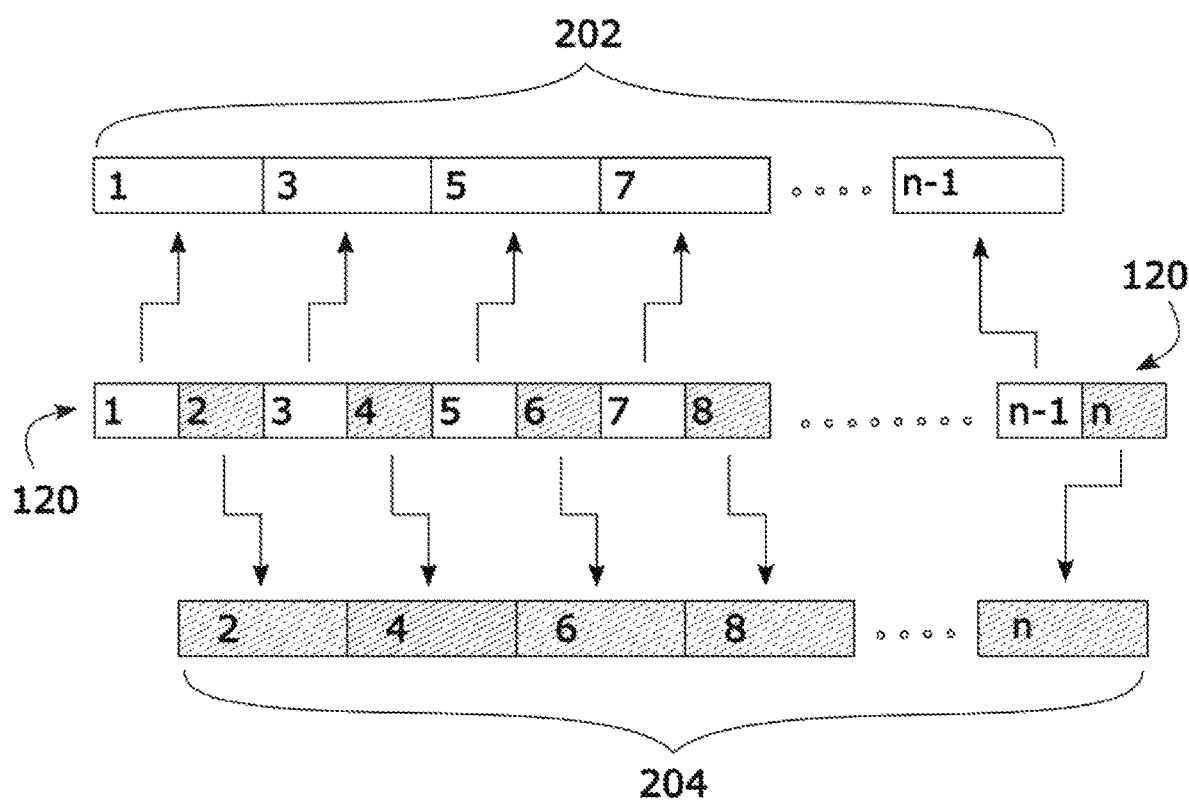
FIG. 2 is a schematic diagram showing how to process footage of a scene illuminated sequentially by two lighting setups so as to produce two respective pieces of footage of the scene each showing the scene illuminated by one of the two lighting setups.

With reference to FIG. 2, a schematic diagram is shown including the sequence of frames 120 with individual frames numbered 1 through n, with n being an even number. The sequence of frames 120 produce two respective pieces of footage of the scene, each showing the scene illuminated by one of the two lighting setups: the first lighting setup 116, and the second lighting setup 118 (both shown in FIG. 1A). The odd-numbered frames of the sequence of frames 120 produce footage of an odd frame clip 202, and the even-numbered frames of the sequence of frames 120 produce footage of an even frame clip 204.

Figure 3:
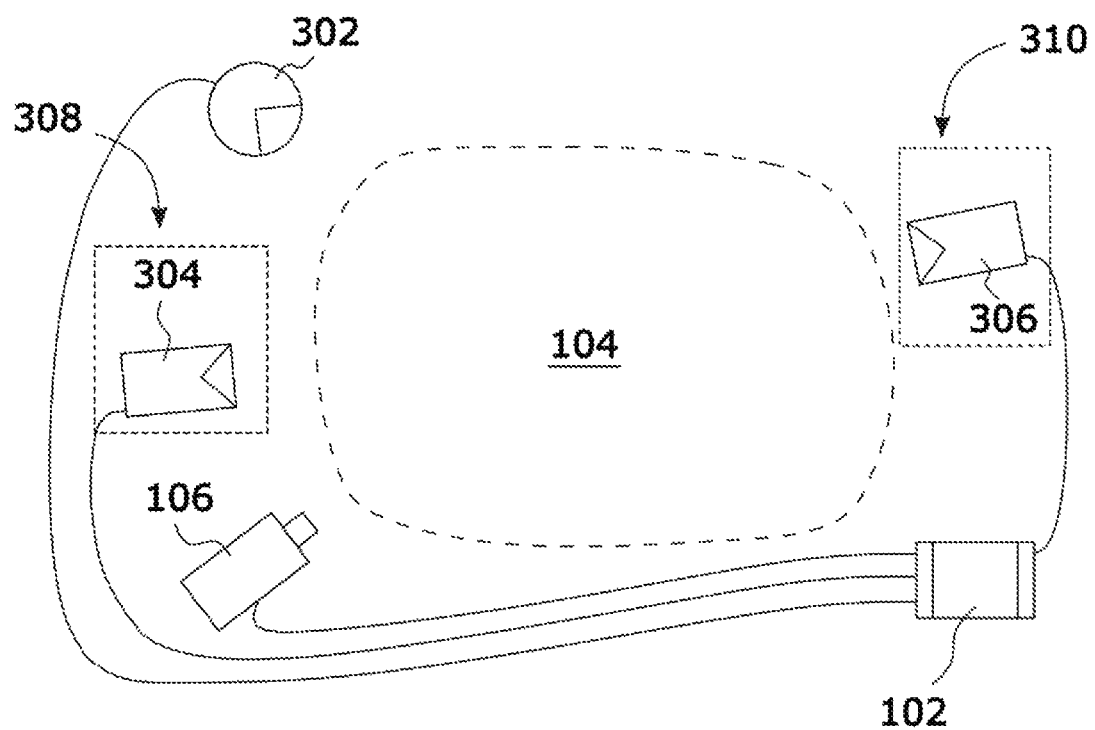
FIG. 3 is a schematic diagram of a top view of a scene lit with a continuous light source and two light sources, the light sources being controlled by a controller that receives timing signals from a camera recording the scene so as to provide two lighting setups.

With reference to FIG. 3, a schematic diagram of a top view of a scene lit with two light sources is shown of an apparatus for recording a scene using multiple lighting setups 300. Included is the controller 102 in communication with the camera 106 configured to record the scene 104. In this embodiment, a continuous light source 302 provides constant illumination for the scene 104. In addition, a light source 304 and a light source 306 each provide short duration illumination for the scene 104. The lighting is divided into two lighting setups: a first lighting setup 308, and a second lighting setup 310.

Figure 4:
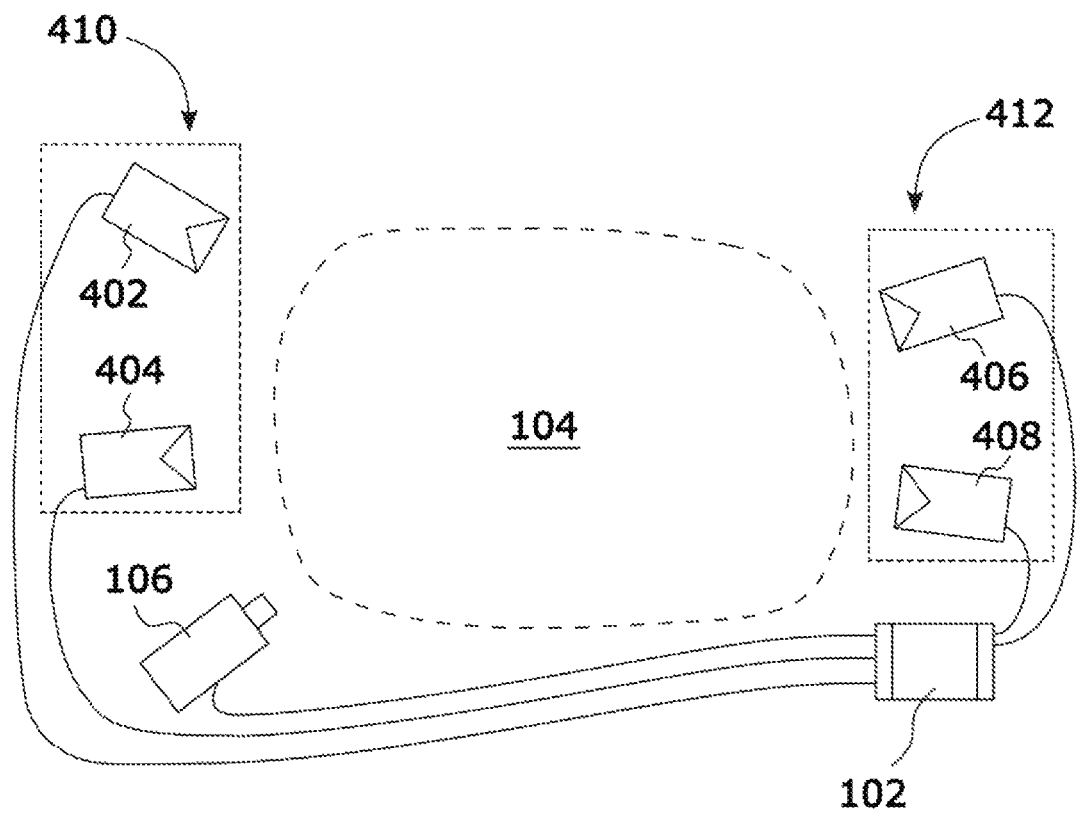
FIG. 4 is a schematic diagram of a top view of a scene lit with four light sources, the light sources being controlled by a controller that receives timing signals from a camera recording the scene so as to provide two lighting setups, the first lighting setup having two light sources and the second lighting setup having two light sources.

With reference to FIG. 4, a schematic diagram of a top view of a scene lit with four light sources is shown of an apparatus for recording a scene using multiple lighting setups 400. Included is the controller 102 in communication with the camera 106 configured to record the scene 104. In this embodiment, a light source 402 and a light source 404 are included in a first lighting setup 410 to provide light for the scene 104. In addition, a light source 406 and a light source 408 are included in a second lighting setup 412 to provide light for the scene 104.

The controller 102 activates the first lighting setup 410 at a time within the odd-numbered frames of the sequence of frames 120 (shown in FIG. 1A), and the controller 102 activates the second lighting setup 412 within the even-numbered frames of the sequence of frames 120 (shown in FIG. 1A).

The first lighting setup 410 includes the light source 402 and the light source 404, both synchronized by the controller 102 to provide short duration illumination to the scene 104 at the same time, corresponding to the odd frames in the sequence of frames 120 (shown in FIG. 1A).

The second lighting setup 412 includes the light source 406 and the light source 408, both synchronized by the controller 102 to provide short duration illumination to the scene 104 at the same time, corresponding to the even frames in the sequence of frames 120 (shown in FIG. 1A).

Figure 5:
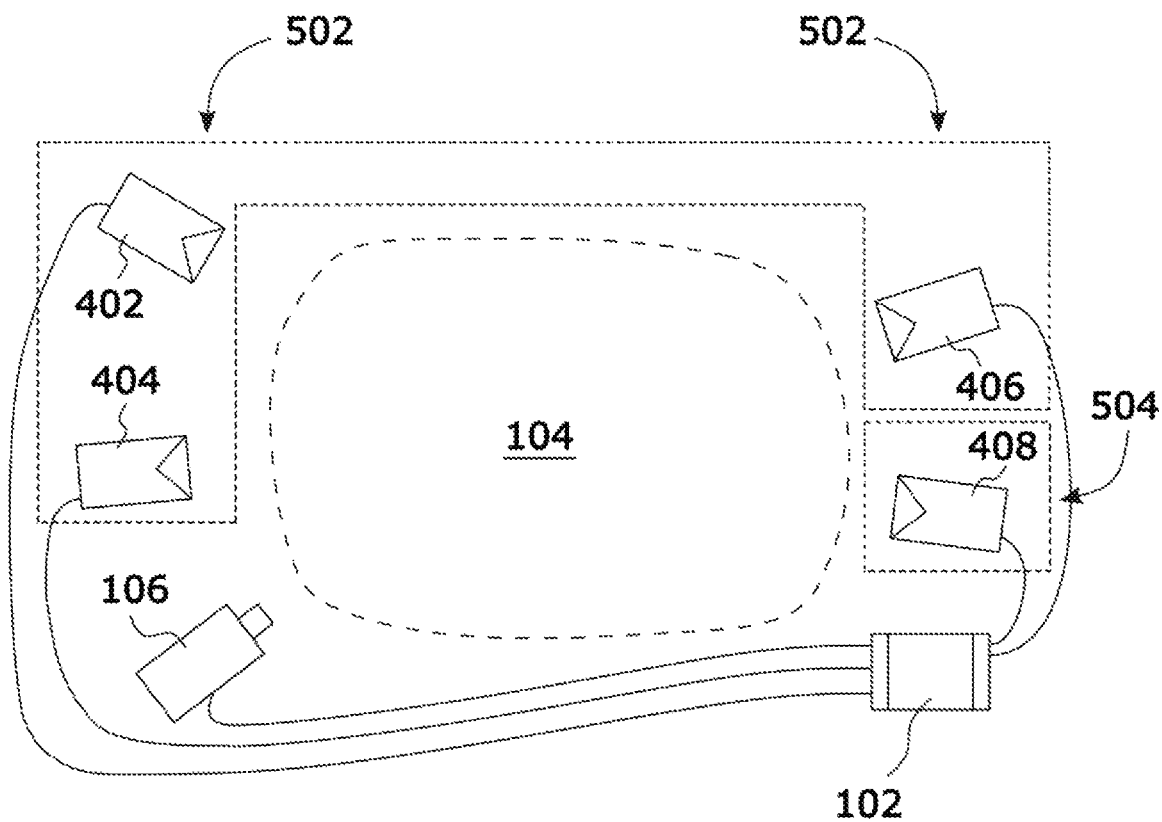
FIG. 5 is a schematic diagram of a top view of a scene lit with four light sources, the light sources being controlled by a controller that receives timing signals from a camera recording the scene so as to provide two lighting setups, the first lighting setup having three light sources and the second lighting setup having one light source.

With reference to FIG. 5, a schematic diagram of a top view of a scene lit with four light sources is shown of an apparatus for recording a scene using multiple lighting setups 400. Included is the controller 102 in communication with the camera 106 configured to record the scene 104. In this embodiment, the light source 402, the light source 404, and the light source 406 are included in a first lighting setup 502 to provide light for the scene 104. In addition, the light source 408 is included in a second lighting setup 504 to provide light for the scene 104.

The controller 102 activates the first lighting setup 502 at a time within the odd-numbered frames of the sequence of frames 120 (shown in FIG. 1A), and the controller 102 activates the second lighting setup 504 within the even-numbered frames of the sequence of frames 120 (shown in FIG. 1A).

The first lighting setup 502 includes the light source 402, the light source 404, and the light source 406, all synchronized by the controller 102 to provide short duration illumination to the scene 104 at the same time, corresponding to the odd frames in the sequence of frames 120 (shown in FIG. 1A).

The second lighting setup 504 includes the light source 408, being synchronized by the controller 102 to provide short duration illumination at times corresponding to the even frames in the sequence of frames 120 (shown in FIG. 1A).

Figure 6:
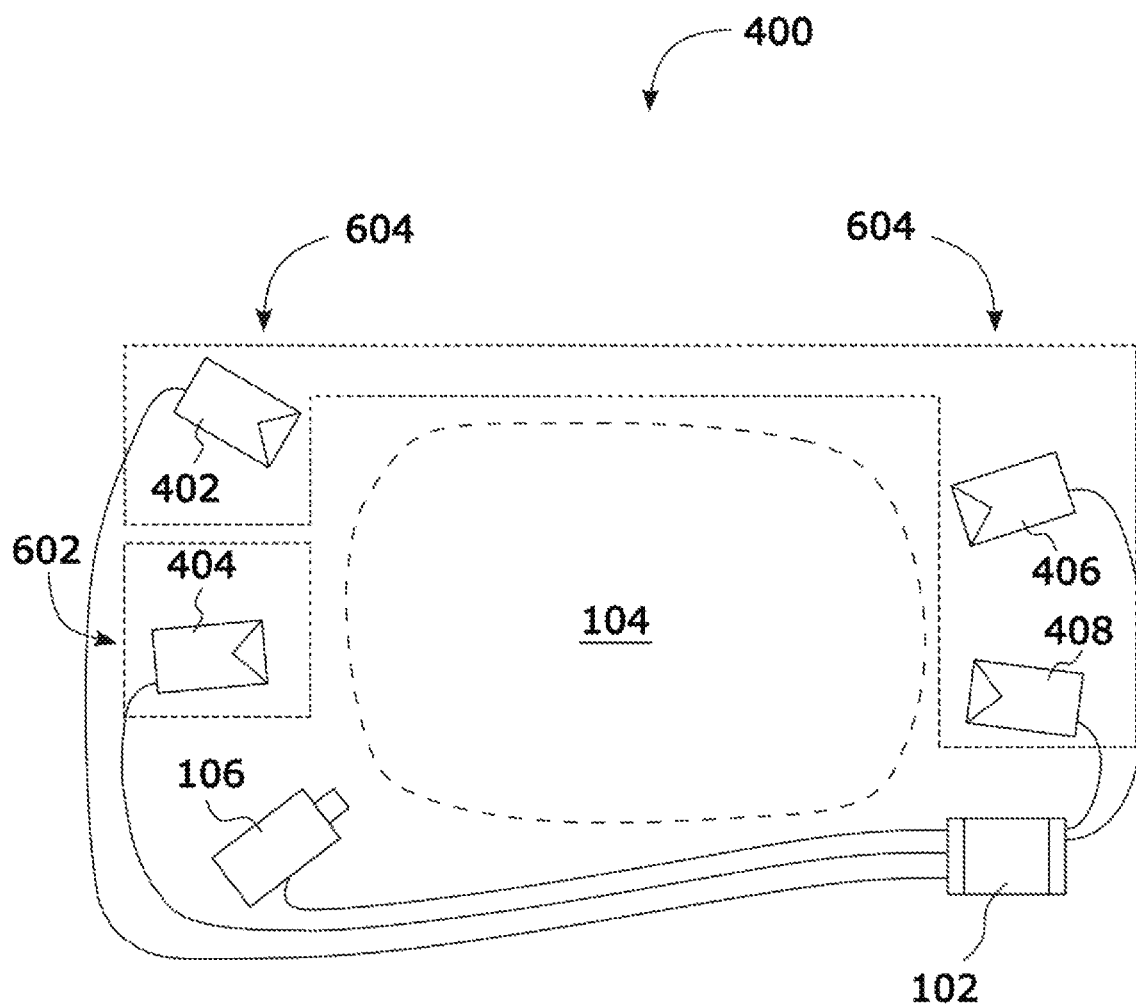
FIG. 6 is a schematic diagram of a top view of a scene lit with four light sources, the light sources being controlled by a controller that receives timing signals from a camera recording the scene so as to provide two lighting setups, the first lighting setup having one light source and the second lighting setup having three light sources.

With reference to FIG. 6, a schematic diagram of a top view of a scene lit with four light sources is shown of an apparatus for recording a scene using multiple lighting setups 400. Included is the controller 102 in communication with the camera 106 configured to record the scene 104. In this embodiment, the light source 404 is included in a first lighting setup 602 to provide light for the scene 104. In addition, the light source 402, the light source 406, and the light source 408 are included in a second lighting setup 604 to provide light for the scene 104.

The controller 102 activates the first lighting setup 602 at a time within the odd-numbered frames of the sequence of frames 120 (shown in FIG. 1A), and the controller 102 activates the second lighting setup 604 within the even-numbered frames of the sequence of frames 120 (shown in FIG. 1A).

The first lighting setup 602 includes the light source 404, being synchronized by the controller 102 to provide short duration illumination at times corresponding to the add frames in the sequence of frames 120 (shown in FIG. 1A).

The second lighting setup 604 includes the light source 402, the light source 406, and the light source 408, all synchronized by the controller 102 to provide short duration illumination to the scene 104 at the same time, corresponding to the even frames in the sequence of frames 120 (shown in FIG. 1A).

Figure 7:
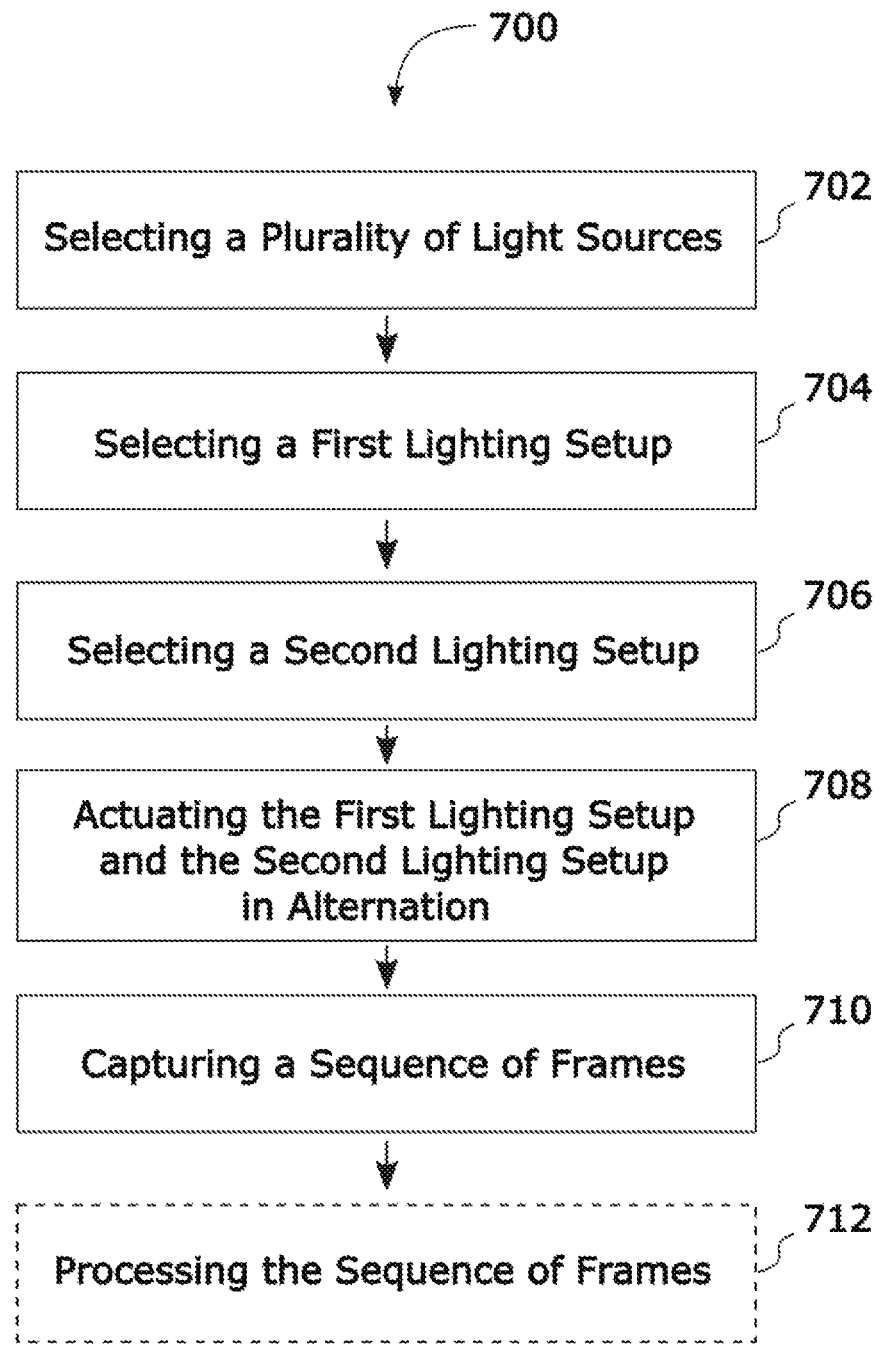
FIG. 7 is a flow chart of a method for recording a scene using two alternating lighting setups so as to concurrently produce motion picture footage of the scene for each lighting setup of the scene, each motion picture footage having minimized time offset with respect to each other.

With reference to FIG. 7, a flow chart is shown for a method 700 for recording a scene using two alternating lighting setups so as to concurrently produce motion picture footage of the scene for each lighting setup of the scene, the motion picture clips having minimized time offset with respect to each other. The method includes selecting a plurality of light sources 702, with each light source configured to illuminate the scene 104 (shown in FIG. 1A). Subsequently, the method 700 includes selecting a first lighting setup 704 from the plurality of light sources, selecting a second lighting setup 706 from the plurality of light sources, the second lighting setup selected being different from the first lighting setup. Subsequently, the method 700 includes actuating the first lighting setup and the second lighting setup in alternation 708, in accordance with a timing signal, including actuating the first lighting setup just prior to an end of a frame, and actuating the second lighting setup just after a beginning of an immediately subsequent frame. The method 700 also includes capturing a sequence of frames 710 using a camera, each one of the frames showing the scene illuminated by one of the two lighting setups in alternation. Optionally, the method 700 may include processing the sequence of frames 712, so as to generate two separate clips of footage of the scene, each clip corresponding to one of the lighting setups.

$\frac{1}{60}$th of a second is a common threshold whereby a number of everyday types of motions appear frozen at this speed or faster. Accordingly, a simple formula has been developed according to the invention to find the outside limits for when the first lighting setup begins to fire and the second lighting setup finishes firing.

The formula is: $d=b/2$, where $d$=the time from when the first lighting setup starts firing until the end of the frame it is in, and also $d$=the time from the start of the frame the second lighting setup fires in until the end of duration of the second lighting setup. Therefore, $b=2d$, i.e., the base frame rate is DOUBLE the finishing frame rate For example, 30 frames per second is the desired finishing frame rate, so the base frame rate is 60 frames per second, which equates to 16.67 milliseconds per frame. Half of this is 8.33 milliseconds. Thus, from the start of the first lighting setup firing until the end of the frame can be up to 8.33 milliseconds. Also, the beginning of the next frame until the end of the second lighting setup finishing firing can be up to 8.33 milliseconds.

The total time from the start of the first lighting setup firing until the end of the second lighting setup firing therefore is 16.67 milliseconds, which is just above $\frac{1}{60}$th of a second. Therefore, the formula indicates a limit at 30 frames per second, so that for lower frame rates, the maximum time is still 16.67 milliseconds.

Other modifications and implementations will occur to those skilled in the art without departing from the spirit and the scope of the invention as claimed. Accordingly, the above description is not intended to limit the invention, except as indicated in the following claims.

What is claimed is:

1. A system for recording, as a single cinematic sequence of frames, images of a scene illuminated with two different lighting schemes by timing alternate actuation of the lighting schemes within associated pairs of adjacent frames to minimize visual motion artifacts between images captured therein, the system comprising:
   a first set of one or more light sources configured to illuminate the scene in accordance with a first one of the two different lighting schemes;
   a second set of one or more light sources configured to illuminate the scene in accordance with a second one of the two different lighting schemes;
   a camera configured to capture an image of the scene within each frame of the cinematic sequence, each frame having a time duration defined by a predetermined base frame rate of the camera; and
   a controller configured to:
      actuate, during each frame of the cinematic sequence, the first and the second set of light sources in alternation on a frame-by-frame basis to capture first and second images of the scene within first and second frames of each associated pair of adjacent frames respectively, the first and second images being illuminated by the first and second lighting schemes respectively, and time the alternate actuations within each associated pair of adjacent frames relative to one another to render negligible any visual motion artifacts therebetween, the timing of the alternate actuations including minimizing a lighting interval duration, the lighting interval duration being a period of time from actuation of the first set of lighting sources to a time when the second lighting setup has become dark after actuation, such that for each associated pair of adjacent frames:

a frame boundary separates an end of the first frame from the beginning of the second frame, and the controller is further configured to generate a timing signal to actuate the first set of lighting sources within a second half of the first frame and to actuate the second set of lighting sources within a first half of the second frame, so that the lighting interval spans the frame boundary separating the associated pair of adjacent frames.

2. The system of claim 1, further comprising a processing module configured to process the sequence of cinematic frames to produce a processed sequence of frames having a finishing frame rate that is half of the predetermined base frame rate of the camera, and wherein each frame of the processed sequence comprises one of the first or the second captured image from each associated pair of frames of the cinematic sequence.

3. The system of claim 1, wherein the lighting interval does not exceed the time duration of the frames of the cinematic sequence.

4. The system of claim 1, wherein the controller derives the timing signal from the camera in accordance with the predetermined base frame rate of the camera.

5. The system of claim 3, wherein the predetermined base frame rate of the camera is determined by motion speed present in the scene.

6. The system of claim 1, wherein the camera is programmable to establish, for the first and second frames of each associated pair, a first and second set of predetermined values for one or more operational parameters of the camera.

7. The system of claim 6, wherein the one or more operational parameters can include at least one of: sensitivity (ISO); aperture; ND (neutral density filter); and shutter angle.

8. The method of claim 3, wherein the predetermined base frame rate of the camera is 60 frames per second, and the lighting interval does not exceed about 17 milliseconds.

9. A method for recording, as a single cinematic sequence of frames, images of a scene illuminated with two different lighting schemes by timing alternate actuation of the lighting schemes within associated pairs of adjacent frames to minimize visual motion artifacts between images captured therein, the method comprising:

establishing a first set of one or more light sources to illuminate the scene in accordance with a first one of the two different lighting schemes;

establishing a second set of one or more light sources to illuminate the scene in accordance with a second one of the two different lighting schemes;

capturing an image of the scene within each frame of the cinematic sequence at a predetermined base frame rate, each frame having a time duration defined by the predetermined base frame rate; and during each frame of the cinematic sequence:

actuating during each frame of the cinematic sequence, the first and the second set of light sources in alternation on a frame-by-frame basis to capture first and second images of the scene within first and second frames of each associated pair respectively, the first and second images being illuminated by the first and second lighting schemes respectively, timing the alternate actuations within the associated pairs of adjacent frames relative to one another to render negligible any visual motion artifacts therebetween, the timing of the alternate actuations including minimizing the lighting interval duration, the lighting interval being a period of time from actuation of the first set of lighting sources to when the second lighting setup has become dark after actuation, and generating a timing signal to actuate the first set of lighting sources within a second half of the first frame, and to actuate the second set of lighting sources within a first half of the second frame, so that the lighting interval spans a frame boundary separating an end of the first frame from a beginning of the second frame of the associated pair, for each of the associated pairs of adjacent frames.

10. The method of claim 9, further including processing the sequence of cinematic frames to produce a processed sequence of frames having a completion frame rate that is half of the predetermined base frame rate of the camera, and wherein each frame of the processed sequence comprises one of the first or the second captured image from each associated pair of frames of the cinematic sequence.

11. The method of claim 9, wherein the lighting interval is not permitted to exceed the time duration of the frames of the cinematic sequence.

12. The method of claim 11, wherein the predetermined base frame rate of the camera is 60 frames per second, and the lighting interval does not exceed about 17 milliseconds.

13. The method of claim 9, wherein the timing signal is derived from the camera in accordance with the predetermined base a-frame rate of the camera.

14. The method of claim 9, further comprising programming the camera to establish, for the first and second frames of each associated pair, a first and second set of predetermined values for one or more operational parameters of the camera.

15. The method of claim 14, wherein the one or more operational parameters can include at least one of: sensitivity (ISO); aperture; ND (neutral density filter); and shutter angle.

16. A method for recording, as a single cinematic sequence of frames, images of a scene illuminated with two different lighting schemes by timing alternate actuation of the lighting schemes within associated pairs of adjacent frames to minimize visual motion artifacts between images captured therein, the method comprising:

establishing a first set of one or more light sources to illuminate the scene in accordance with a first one of the two different lighting schemes;

establishing a second set of one or more light sources to illuminate the scene in accordance with a second one of the two different lighting schemes;

capturing an image of the scene within each frame of the cinematic sequence at a predetermined base frame rate, each frame having a time duration defined by the predetermined base frame rate; and during each frame of the cinematic sequence:

actuating during each frame of the cinematic sequence, the first and the second set of light sources in alternation on a frame-by-frame basis to capture first and second images of the scene within first and second frames of each associated pair respectively, the first and second images being illuminated by the first and second lighting schemes respectively, and timing the alternate actuations within the associated pairs of adjacent frames relative to one another to render negligible any visual motion artifacts therebetween, the predetermined base frame rate of the camera being determined by motion speed present in the scene.

\* \* \* \* \*